(12) United States Patent
Kozyuk et al.

(10) Patent No.: US 9,000,244 B2
(45) Date of Patent: Apr. 7, 2015

(54) PROCESS FOR PRODUCTION OF BIODIESEL

(75) Inventors: Oleg Kozyuk, North Ridgeville, OH (US); Peter Reimers, Shaker Heights, OH (US); Paul A. Reinking, North Olmstead, OH (US)

(73) Assignee: Arisdyne Systems, Inc., Cleveland, OH (US)

( * ) Notice: Subject to any disclaimer, the term of this patent is extended or adjusted under 35 U.S.C. 154(b) by 740 days.

(21) Appl. No.: 13/325,472

(22) Filed: Dec. 14, 2011

(65) Prior Publication Data

US 2012/0157699 A1 Jun. 21, 2012

Related U.S. Application Data

(60) Provisional application No. 61/424,202, filed on Dec. 17, 2010.

(51) Int. Cl.
*C07C 1/00* (2006.01)
*C11C 3/00* (2006.01)
*C10L 1/02* (2006.01)

(52) U.S. Cl.
CPC ........ *C11C 3/003* (2013.01); *C10G 2300/1014* (2013.01); *C10L 1/026* (2013.01); *Y02E 50/13* (2013.01); *C10G 2300/4081* (2013.01)

(58) Field of Classification Search
USPC ............. 44/605, 606, 388, 308; 585/240, 242
See application file for complete search history.

(56) References Cited

U.S. PATENT DOCUMENTS

| | | | |
|---|---|---|---|
| 5,096,566 A | 3/1992 | Dawson et al. | |
| 5,492,654 A | 2/1996 | Kozjuk et al. | |
| 5,810,052 A | 9/1998 | Kozyuk | |
| 5,931,771 A | 8/1999 | Kozyuk | |
| 5,937,906 A | 8/1999 | Kozyuk | |
| 5,969,207 A | 10/1999 | Kozyuk | |
| 5,971,601 A | 10/1999 | Kozyuk | |
| 6,012,492 A | 1/2000 | Kozyuk | |
| 6,035,897 A | 3/2000 | Kozyuk | |
| 6,502,979 B1 | 1/2003 | Kozyuk | |
| 6,802,639 B2 | 10/2004 | Kozyuk | |
| 6,857,774 B2 | 2/2005 | Kozyuk | |
| 7,338,551 B2 | 3/2008 | Kozyuk | |
| 7,507,846 B2 * | 3/2009 | Pelly | 554/170 |
| 7,754,905 B2 * | 7/2010 | Kozyuk | 554/167 |
| 7,935,157 B2 * | 5/2011 | Kozyuk et al. | 44/308 |
| 7,943,035 B2 | 5/2011 | Chornet et al. | |
| 8,002,971 B2 | 8/2011 | Kozyuk | |
| 8,039,652 B2 * | 10/2011 | Portnoff et al. | 554/169 |
| 8,105,480 B2 | 1/2012 | Chornet et al. | |
| 8,709,109 B2 * | 4/2014 | Kozyuk et al. | 44/388 |
| 2005/0136123 A1 | 6/2005 | Kozyuk | |
| 2005/0274065 A1 * | 12/2005 | Portnoff et al. | 44/605 |
| 2010/0175309 A1 | 7/2010 | Kozyuk et al. | |
| 2011/0166378 A1 * | 7/2011 | Pelly | 560/129 |
| 2011/0240517 A1 | 10/2011 | Chornet et al. | |
| 2012/0279111 A1 * | 11/2012 | Blasco Garcia | 44/388 |

* cited by examiner

*Primary Examiner* — Nina Bhat
(74) *Attorney, Agent, or Firm* — Pearne & Gordon LLP

(57) ABSTRACT

A multi-stage reactor system for preparing biodiesel is used to increase efficiency and yield and reduce impurities. A three-stage transesterification reaction for preparing biodiesel can include one high-shear cavitation reactor and two low-shear cavitation reactors, preferably in series, and optionally one or more separation vessels for removing waste and recycling triglyceride feedstock, catalyst and alcohol to the high-shear cavitation reactor.

16 Claims, 2 Drawing Sheets

PROCESS FOR PRODUCTION OF BIODIESEL

This application claims the benefit of U.S. provisional application Ser. No. 61/424,202 filed Dec. 17, 2010, the contents of which are incorporated herein in their entirety by reference.

FIELD

The invention relates to a process for preparing biodiesel, and more particularly, a process for improving the quality of biodiesel using a multi-stage reactor system to increase efficiency and yield and reduce impurities.

BACKGROUND

Transesterification reactions can use alcohol, such as methanol and ethanol, catalysts, for example acid catalysts such as sulfonic and sulfuric acids, various metallic compounds, for example metallic salts such as titanium, zinc, magnesium, tin, antimony or lead salts. The metallic compounds also can be used in form of alcoholates, alkyl derivatives or oxides. Due to the high reactivity of basic catalysts, such as NaOH, KOH or LiOH, use of such catalysts is preferred in a methanol solution.

Transesterification reactions are generally carried out in a single catalysis stage in the case of a batch reaction or in two catalysis stages in the case of a continuous operation using overflow reactors. However, two-stage transesterification reactions include high residence times, for example 1-10 minutes to several hours for the first transesterification reaction and 1-10 minutes to several hours for the second transesterification reaction, while the separation step is static and requires settling time further increasing the process cycle time. Still further, single-stage reactions suffer from lower yields and can require high residence times. Despite the plentiful art, there exists a need for an efficient, cost-effective transesterification apparatus and process that provides high yield and short residence.

SUMMARY

A process for preparing biodiesel including reacting a triglyceride feedstock, alcohol and catalyst in a high-shear reactor to form a first intermediate reacted mixture, reacting the first intermediate reacted mixture in a low-shear reactor to form a second intermediate reacted mixture, and reacting the second intermediate reacted mixture in a second low-shear reactor to form a crude biodiesel reacted mixture.

A three-stage transestrification reaction for preparing biodiesel including reacting a triglyceride feedstock, alcohol and catalyst in a high-shear reactor to form a first intermediate reacted mixture, wherein the ratio of the catalyst to the triglyceride feedstock is less than 1.9 by weight, reacting the first intermediate reacted mixture in a low-shear reactor to form a second intermediate reacted mixture, passing the second intermediate reacted mixture through a separation vessel to form a purified second intermediate reacted mixture, adding additional non-recycled alcohol and additional non-recycled catalyst to the purified second intermediate reacted mixture, wherein the ratio of the total catalyst to the triglyceride feedstock is less than 0.8 by weight, reacting the purified second intermediate reacted mixture in a second low-shear reactor to form a crude biodiesel reacted mixture, and passing the crude biodiesel reacted mixture through a separation vessel to form a purified biodiesel product that product meets the triglyceride feedstock conversion level required by ASTM 6751.

DETAILED DESCRIPTION

Figure 1:
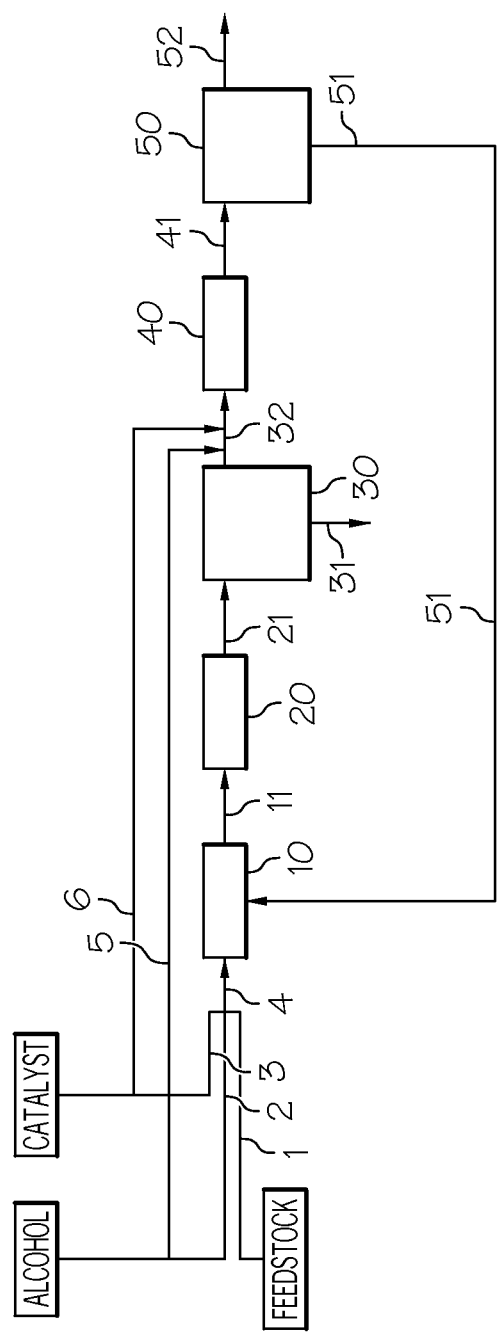
FIG. 1 shows a flow diagram of a biodiesel production process using cavitation.

Herein, when a range such as 5-25 (or 5 to 25) is given, this means preferably at least 5 and, separately and independently, preferably not more than 25. In an example, such a range defines independently not less than 5, and separately and independently, not less than 25.

A process has been discovered for an efficient, cost-effective production of biodiesel by a three-stage transesterification reaction of triglycerides with alcohol in the presence of a catalyst, such as a basic catalyst. It has been found that a three-stage process provides a more economical process for the production of biodiesel by way of reacting triglycerides and alcohol and more favorable reaction kinetics can be achieved to provide shorter residence times and increased throughput. Further, a three-stage transesterification reaction can reduce the amount of catalyst required to complete the reaction and lead to a reduction in the amount of monoglycerides produced as compared with other transesterification reaction systems, such as batch operations and two-stage set ups. Thus, the reduction of catalyst required to complete the transesterification reaction reduces the cost of components.

The three-stage transesterification process described herein also achieves a reduction in undesirable components or impurities in the biodiesel product stream. For example, the described process can reduce the amount of monoglycerides contained in the biodiesel product stream, which can otherwise lead to filter clogging. Monoglycerides can be reduced in various ways such as achieving high conversion rates (i.e. all triglycerides are fully reacted to form alkyl esters), allowing for high retention times for increased separation of monoglycerides and increasing catalyst amounts to promote high conversion rates. High retention times and increased catalyst amounts can result in process disadvantages such as a longer production process, increased costs and lower production rates.

The transesterification process can be carried out in a reactor system including in series a high-shear cavitation reactor and at least two low-shear reactors, and optionally one or more separation means within the system to provide enriched feed and recycle streams as desired.

A pre-reaction mixture for applying cavitational energy, such as in the high-shear cavitation reactor, includes a triglyceride feedstock 1, alcohol 2 and a catalyst 3. Alternatively, the catalyst and/or alcohol can be introduced into the reactors separately from the other reactants, such as the triglyceride feedstock or a recycle stream. The triglyceride feedstock 1 source can be, but is not limited to, soybean oil, such as crude de-gummed once-refined soy oil, corn oil, cottonseed oil, olive oil, palm oil, palm kernel oil, peanut oil, linseed oil, safflower oil, canola oil, rapeseed oil, sesame oil, coconut oil, jatrohpa oil, mustard seed oil, castor oil, tall oil, algae oil, soap stock, tallow, lard, brown grease, white grease, yellow grease, fish oils, bacterial oils or fungal oils, as well as wastes, effluents and residues from the processing of such materials. The feedstock source can also be comprised of multiple free fatty acid sources, such as blends of oils and/or animal fats.

The triglyceride feedstock preferably contains a content of free fatty acid in the range of 0.1 to 3% by weight of the feedstock.

The alcohol 2 of the pre-reaction mixture can be a lower alcohol having one to five carbon atoms, wherein the alcohol can also be branched or unbranched. For example, the lower alcohol can be selected from the group consisting of methanol, ethanol, propanol, isopropyl, butanol and mixtures thereof. Ethanol and methanol are preferred alcohols. The quantity of alcohol in the pre-reaction mixture can be a ratio of triglyceride feedstock to alcohol of 1:3 to 1:5, or as shown below in the Examples, 1:4.2.

The catalyst 3 can be acidic or basic. Suitable catalysts for the transesterification reaction are alkalis, such as alkali metal catalysts including soluble NaOH, LiOH, KOH, carbonates and corresponding sodium and potassium alkoxides such as sodium methoxide, sodium ethoxide, sodium propoxide, sodium butoxide, and sodium methylate, which may be used independently or as their mixture of suitable mixing ratio. The weight percent of catalyst to triglyceride feedstock can be in the range of 0.1 to 1, or as shown below in the Examples, 0.35.

The first step of the three-stage transesterification reaction includes a transesterification reaction wherein a triglyceride 1 and an alcohol 2 are reacted in the presence of a catalyst 3, such as in a pre-reaction mixture, and cavitation, such as a high-shear reactor, to produce a first intermediate reacted mixture including fatty acid alkyl esters and glycerol. In addition, the first intermediate reacted mixture may include unreacted and/or partially reacted triglycerides, remaining catalyst, and unreacted alcohol. In the second step, the resulting first intermediate reacted mixture is then passed to the second reactor, for example a low-shear reactor, wherein the unreacted triglyceride from the feedstock and an unreacted alcohol are further reacted in the presence of a catalyst, such as the remaining catalyst, to increase the reaction conversion rate and form a second intermediate reacted mixture. The third step of the transesterification reaction includes addition of fresh alcohol and catalyst to the second intermediate reacted mixture to complete the reaction and increase its conversion rate thereby forming a crude biodiesel reacted mixture. The crude biodiesel reacted mixture is further treated to separate the alkyl ester biodiesel product (i.e. a purified biodiesel product) from the by-products and unreacted reactants to achieve a purified biodiesel product.

Referring to the drawings, various embodiments of the multi-stage transesterification reaction process will be described. As shown in the drawings, pipes, hoses, or other conventional, industrial equipment can be used to facilitate the fluid communication of the elements and streams discussed below.

An embodiment of the three-stage transesterification reaction process shown as a flow diagram in FIG. 1 is described below.

The three-stage transesterification reaction is implemented by contacting a triglyceride feedstock stream 1 with alcohol 2 and catalyst 3 feed streams, wherein streams 1, 2 and 3, which form a pre-reaction mixture 4, can have a temperature of from about 20° C. to about 100° C., for example at least 20, 30, 40, 50, 60, 70, 80, 90 or 100° C. Although not shown, streams 1, 2 and 3 can be individually fed, and optionally in addition to or combined with a recycle stream, to the high-shear reactor 10 such that a pre-reaction mixture 4 is not prepared. The triglyceride feedstock 1 preferably contains less than 1.5 weight percent free fatty acid, and preferably less than 200 ppm phosphorous or a phosphorous compound. The ratio of catalyst 3 to triglyceride feedstock 1 fed to and reacted in the high-shear reactor 10 can be in the range of 1.2 to 1.8, preferably 1.4 to 1.7, or about 1.5, 1.55, 1.6 or 1.65 by weight. The ratio of alcohol 2 to triglyceride feedstock 1 fed to and reacted in the high-shear reactor 10 can be in the range of 12 to 18, preferably 14 to 16, or about 14.5, 15 or 15.5 by weight.

Streams 1, 2, and 3, are reacted in a high-shear reactor 10 to form a first intermediate reacted mixture stream 11 containing fatty acid alkyl esters, glycerol and impurities, in addition to unreacted alcohol, remaining catalyst and unreacted feedstock. Preferably, the high-shear reactor 10 is a cavitation reactor operated at a shear rate of greater than 8,000 s$^{-1}$, for example at least 8,000, 10,000, 15,000, 20,000, 40,000, 60,000, 80,000, 100,000, 200,000, 400,000, 800.000 or 1,000,000 s$^{-1}$.

Examples of a suitable high shear reactor include, but are not limited to, rotor-rotor, rotor-stator mixer, homogenizer, microfluidizer, hydrodynamic or ultrasonic cavitation device, control flow cavitation reactor, static mixer, orifice plate, perforated plate, nozzle, venturi eductor, jet mixer and the like. Hydrodynamic cavitation devices can include those described in U.S. Pat. Nos. 5,810,052; 5,931,771; 5,937,906; 5,971,601; 6,012,492; 6,502,979; 6,802,639; 6,857,774, ultrasound devices can include those supplied by Branson Sonifiers, Sonics & Materials Processors, Sonic Corp. Sonolators, rotor-stator mixers can include those supplied by IKA WORKS, Kady International, Charles Ross and Son Company, Silverson Machines, and rotor-rotor mixers can include thos suppied by Pulsar.

The residence time of the pre-reaction mixture, or individual reaction components, in the high-shear reactor can be less than 10 seconds, preferably less than 5 seconds, and preferably less than 1 second. As described herein, the high-shear reactor preferably operates as a single-pass reactor. Pressure drop across the high-shear reactor can be in the range of 50 to 1000, preferably 100 to 750 and more preferably between 250 and 700 psi.

Preferably, at least 60 weight percent of the triglycerides in the feedstock 1 are reacted or converted, thus leaving 40 weight percent or less of triglyceride from the pre-reaction mixture 4 available for conversion. Alternatively, at least 65, 70, 75, 80, 85 or 90 weight percent of the triglycerides in the feedstock 1 are reacted in the initial transesterification reaction induced by the high-shear reactor 10.

As discussed in the Examples below, high-shear cavitational energy can be created by passing the pre-reaction mixture or individual reaction components through a static cavitation reactor having one or multiple orifices in series, such as a first orifice stage, or optionally coupling the first orifice state in series with a second orifice stage. Each stage can include a single orifice or optionally orifices in parallel or in series as desired. Orifice diameters can be in the range of 1 mm to 20 mm.

The first intermediate reacted mixture 11 is feed to a low-shear reactor 20 where the remaining triglyceride feedstock and alcohol are reacted in the presence of the remaining catalyst to form a second intermediate reacted mixture stream 21 including fatty acid alkyl esters, glycerol, unreacted triglyceride feedstock, catalyst and unreacted alcohol. The first intermediate reacted mixture 11 is preferably fed into the low-shear reactor 20 at a temperature of from about 20° C. to about 100° C., for example at least 20, 30, 40, 50, 60,70, 80, 90 or 100° C. Preferably, the low-shear reactor 20 is operated at a shear rate of less than 1,000 s$^{-1}$. For example, the low-shear reactor can operate at a shear rate less than 1,000, 800, 600, 400, 200 or 100 s$^{-1}$. The residence time of the first intermediate reacted mixture in the low-shear reactor can be in the range of 10 to 100, preferably 20 40 or about 30 minutes.

Optionally, the second intermediate reacted mixture is passed through separator or decanter 30 to form a purified second intermediate reacted mixture stream 32. Separation also can be achieved with the centrifuge, hydrocyclone or similar separation equipment. Because the glycerol by-product of the reaction has a higher density than the fatty acid alkyl esters, a rapid and distinct separation of the two components results. Therefore, the heavy phase stream 31, containing glycerol and some unreacted alcohol, is separated and removed to form the second intermediate reacted mixture stream 21 to form a purified second intermediate reacted mixture. The separated waste glycerol 31 from the separation vessel 30 reduces the amount of potential impurities downstream of the biodiesel process. In one embodiment, the waste stream 31 being separated from the second intermediate reacted mixture 21, or a portion thereof, can be recycled, no shown. The waste stream 31 can be used to form a portion of the pre-reaction mixture 4 being fed into the high-shear reactor 10. Portions of the unreacted alcohol, unreacted catalyst and unreacted triglyceride can form the pre-reaction mixture and be reacted in the reactor 10. Any glycerol present in the waste stream 31 can be further mixed in the reactor 10, and preferably entrap impurities that lead to filter clogging and an increase of cold soak filtration times of the biodiesel product. Alternatively, the waste stream 31 can be discarded and not recycled.

Separation temperatures in the separation vessel 30 can be adjusted as desired, for example, the separation temperature can be in the range of 20° C. to 150° C., 30° C. to 100° C. or 40° C. to 80° C. Preferably, the second intermediate reacted mixture 21 can be introduced into the separation vessel 30 at a temperature in the range of 20° C. to 60° C. Thus, as discussed below, the purified second intermediate reacted mixture 32 can be fed into the second low-shear reactor 40 at a temperature of 30° C. to 65° C.

The purified second intermediate reacted mixture stream 32, containing fatty acid alkyl esters and unreacted triglyceride feedstock, can be combined with additional alcohol 5 and catalyst 6 in a second low-shear reactor 40 to form a third intermediate reacted mixture stream 41. The additional alcohol 5 and catalyst 6 feeds can be non-recycled components that are identical to the alcohol 2 and catalyst 3 being fed to the high-shear reactor 10. Optionally, the additional alcohol 5 and catalyst 6 can be recycled components, such as those separated from intermediate reacted streams, or a combination of recycled and fresh material. Depending on the quantity of unreacted alcohol and unreacted catalyst being removed from the second intermediate reacted mixture 21 by the separation vessel 30 in the waste glycerol stream 31, additional alcohol 5 and catalyst 6 may be needed to continue the transesterification reaction. The amount of alcohol 5 and catalyst 6 added to the second pressurized reaction tank 30 can be adjusted as desired. Preferably, the ratio of additional catalyst 6 to unreacted triglyceride feedstock in the purified second intermediate reacted mixture 32 fed to and reacted in the second low-shear reactor 40 can be in the range of 0.3 to 0.7, preferably 0.4 to 0.6, or about 0.45, 0.5 or 0.55 by weight. The ratio of additional alcohol 5 to unreacted triglyceride feedstock remaining in the purified second intermediate reacted mixture 32 being fed to and reacted in the second low-shear reactor 40 can be in the range of 5 to 9, preferably 6 to 8, or about 6.5, 7 or 7.5 by weight.

The purified second intermediate reacted mixture 32 is preferably fed into the second low-shear reactor 40 at a temperature of from 20° C. to 100° C., for example at least 20, 30, 40, 50, 60, 70, 80, 90 or 100° C. The second low-shear reactor 40 is preferably operated at a shear rate of less than 1,000 s$^{-1}$, for example less than 1,000, 800, 600, 400, 200 or 100 s$^{-1}$. The residence time of the purified second intermediate reacted mixture in the second low-shear reactor can be in the range of 10 to 100, preferably 20 to 40 or about 30 minutes. Once the transterification reaction in the second low-shear reactor 40 is substantially complete, the crude biodiesel reacted mixture 41 is optionally passed through a separator or decanter 50 to separate the crude biodiesel reacted mixture 41 into two phases, a heavy phase 51 (waste stream) and a light phase 52 (purified biodiesel reacted product). Heavy phase 51, containing glycerol, impurities and unreacted alcohol can be recycled and mixed in the high-shear reactor 10 with streams 1, 2 and 3, or optionally discarded and not recycled. Suitably, at least 70% of the glycerol, unreacted catalyst and unreacted alcohol in the heavy phase stream 51 is recycled from separation vessel 50 to the high-shear reactor 10. Recycling catalyst from stream 51 to the high-shear reactor 10 provides for increased efficiency and allows for use of less catalyst in the transesterification process, which utilizes a stream 51 that would otherwise be discarded. In particular, because fresh catalyst 6 is optionally added to the purified second intermediate reacted mixture 32 prior to being fed into the second low-shear reactor 40, the heavy phase stream 51 has the tendency to contain greater amounts of unreacted catalyst and/or unreacted alcohol as compared to waste stream 31 that has been fed to at least the high-shear reactor 10 and the low-shear reactor 20. The light phase 52, the purified biodiesel reacted product, containing fatty acid alkyl esters is removed from the separation vessel 50 and transferred into further separation stages to purify the resulting fatty acid asters into biodiesel grade fatty acid esters as know in the art. Separation of the crude biodiesel reacted mixture also can be done with the centrifuge, hydrocyclone or similar separation equipment.

With reference to the low-shear reactor 20 and the second low-shear reactor 40, the reactors 20, 40 can be, but are not limited to, a reaction vessel having a stirrer, agitator or low-shear rotor-stator, a vessel having a recirculation loop, for example a recirculation loop passing through a mixer such as a centrifugal pump, or a static mixer within a pipe or a similar container. The maximum shear rate is calculated as the tip speed of the impeller divided by the gap between the impeller and the mixing tank as described below.

The three-stage transesterification reaction described herein reduces the amount of catalyst necessary to complete the transesterification reaction by utilizing a series of reactors and recycle streams. The amount of the fresh catalyst used to feed the first high-shear reactor 10 can be from about 0 to about 80 percent by weight of total amount fresh catalyst used in the three-stage transesterification reaction. The amount of fresh catalyst used to feed the second low-shear reactor 40 can be, for example as part of the purified second intermediate reacted mixture 32, from about 20 to about 100 percent by weight of total amount fresh catalyst used in the three-stage transesterification reaction. In such a case, the remaining portion of catalyst feed to the high-shear reactor 10 is supplied by recycle stream 51. If the amount of the fresh catalyst fed to the high-shear reactor 10 is 0 percent, all 100 percent of fresh catalyst used in the three-stage transesterification reaction can be fed to the second low-shear reactor 40. In such a case, the catalyst 3 feed to the high-shear reactor 10 is entirely supplied by recycle stream 51. The amount of the fresh alcohol used to feed the high-shear reactor 10 can be from about 20 to about 80 percent by weight of total amount fresh alcohol used in the three-stage transesterification reaction. The amount of fresh alcohol used to feed the second low-shear reactor 40, for example as part of the purified second intermediate reacted mixture 32, can be from about 20 to about 80 percent by weight of total amount fresh alcohol used in the three-stage transesterification reaction.

As used herein, to specify shear rates, the following equation can be used for calculating the shear rate for rotor-rotor mixers or rotor-stator mixers:

$$Shearrate(t) = \frac{velocity\ (v)}{gap\ distance\ (g)}$$

wherein V is the tip speed of rotor (m/s), and g is the gap distance between rotor and stator (m). Notably, the tip speed of the rotor (V) should be at least 10 m/sec.

As used herein, to specify the shear rate for a homogenizer, microfluidizer, hydrodynamic, ultrasonic cavitation device, control flow cavitation reactor, static mixer, orifice plate, perforated plate, nozzle, venturi eductor or jet mixer, the following equation can be used:

$$Shearrate = \frac{velocity\ (v)}{diameter\ (d)}$$

wherein V is the flow velocity in the gap, orifice, or nozzle (m/s), and d is the gap, orifice, nozzle diameter or size (m). Notably, the velocity in the gap, orifice, or nozzle (V) should be at least 10 m/sec.

Figure 2:
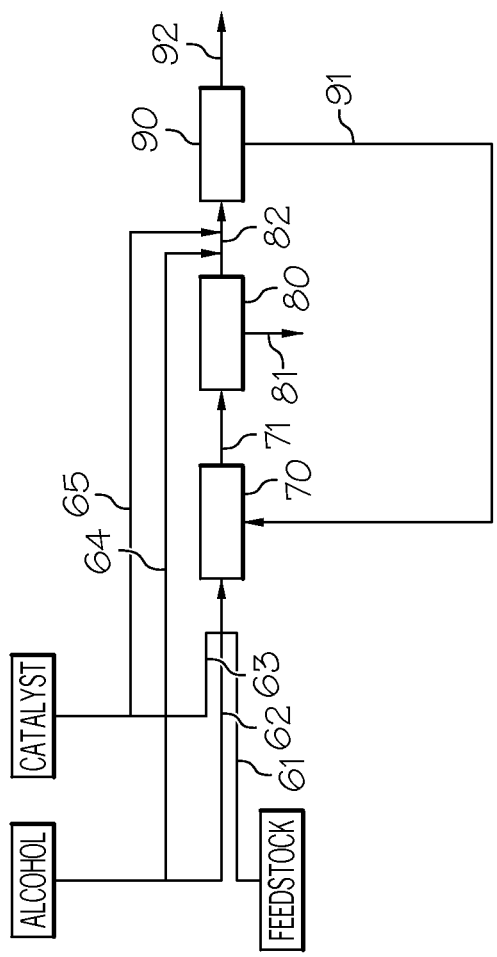
FIG. 2 shows a flow diagram of a biodiesel production process using cavitation.

As shown in FIG. 2, the three-stage transesterification reaction is implemented by contacting a triglyceride feedstock stream 61 with alcohol 62 and catalyst 63 feed streams, wherein streams 61, 62 and 63, which either in combination or individually form a pre-reaction mixture 64, can have a temperature of from about 20° C. to about 100° C. The ratio of alcohol 62 and catalyst 63 to the triglyceride feedstock 61 being fed to and reacted in the high-shear reactor 70 can be as described in FIG. 1 for the high-shear reactor 10.

Streams 61, 62, and 63 are reacted in a high-shear reactor 70 to form a first intermediate reacted mixture stream 71 containing fatty acid alkyl esters, glycerol and impurities, in addition to unreacted alcohol, remaining catalyst and unreacted feedstock. Preferably, the high-shear reactor 70 is a cavitation reactor operated at a shear rate of greater than 8,000 s$^{-1}$ as described above with regard to FIG. 1.

The first intermediate reacted mixture 71 is feed to a low-shear reactor 80 where the remaining triglyceride feedstock and alcohol are reacted in the presence of the remaining catalyst to form a second intermediate reacted mixture stream 82 including fatty acid alkyl esters, glycerol, unreacted triglyceride feedstock, catalyst and unreacted alcohol. The first intermediate reacted mixture 71 is preferably fed into the low-shear reactor 80 at a temperature of from about 20° C. to about 100° C. Preferably, the low-shear reactor 80 is a operated at a shear rate of less than 1,000 s$^{-1}$ as described above with regard to FIG. 1. The residence time of the first intermediate reacted mixture 71 in the low-shear reactor 80 can be in the range of 10 to 100, preferably 20 to 40 or about 30 minutes. Optionally, depending on the type of low-shear reactor 80 used, a heavy phase stream 81 can be separated from the low-shear reactor 80. For example, if the low-shear reactor 80 is a gravity tank with a mixer or agitator, the residence time can be selected to allow for gravitational separation of the heavy phase including the glycerol component, which can be recycled or discarded as desired.

The second intermediate reacted mixture 82, containing fatty acid alkyl esters and unreacted triglyceride feedstock, can be combined with additional alcohol 64 and catalyst 65 in a second low-shear reactor 90 to form a third intermediate reacted mixture stream 92. The ratio of additional alcohol 64 and additional catalyst 65 to the triglyceride feedstock remaining in the second intermediate reacted mixture 82 being fed to and reacted in the second low-shear reactor 90 can be as described in FIG. 1 for the second low-shear reactor 40. The additional alcohol 64 and catalyst 65 feeds can be non-recycled components that are identical to the alcohol 62 and catalyst 63 being fed to the high-shear reactor 70. Optionally, the additional alcohol 64 and catalyst 65 can be recycled components, such as those separated from intermediate reacted streams, or a combination of recycled and fresh material.

The second intermediate reacted mixture 82 is preferably fed into the second low-shear reactor 90 at a temperature of from about 20° C. to about 100° C. Preferably, the second low-shear reactor 90 is a operated at a shear rate of less than 1,000 s$^{-1}$ as described above with regard to FIG. 1. The residence time of the first intermediate reacted mixture 71 in the low-shear reactor 80 can be in the range of 10 to 100, preferably 20 to 40 or about 30 minutes. Depending on the type of second low-shear reactor 90 used, a heavy phase stream 91 can be separated from the second low-shear reactor 90. For example, if the second low-shear reactor 90 is a gravity tank with a mixer or agitator, the residence time can be selected to allow for gravitational separation of the heavy phase including the glycerol component, which can be recycled or discarded as desired. As shown, the heavy glycerol phase 91 is recycled to the high-shear reactor 70 to reduce the amount of fresh catalyst required for the transesterification reaction.

The light phase 92, the purified biodiesel reacted product, containing fatty acid alkyl esters is removed from the separation vessel 90 and transferred into further separation stages to purify the resulting fatty acid asters into biodiesel grade fatty acid esters as know in the art. Separation of the crude biodiesel reacted mixture also can be done with the centrifuge, hydrocyclone or similar separation equipment.

It has been found that the three-stage transesterification processes described herein can achieve an overall conversion of from about 98% to about 99% of triglyceride feedstock into fatty acid alkyl esters using less than 15-25% by weight of catalyst compared to a two-stage transesterification process, such as a process described in Example 1 below.

The described process advantageously addresses the three noted ways of reducing monoglyceride content in the biodiesel product stream, either separately or a combination. For instance, the process reduces the amount of catalyst required to achieve high conversion rates such as 98-99%. Catalyst reduction in the range of about 20% has been observed by implementing the process as disclosed in FIG. 1, as compared to a conventional two-stage process. Retention times also can be reduced by utilizing the first cavitation reactor that can achieve significant conversion in about 10 seconds or less, which reduces total production time. With regard to conversion rates, as noted above, the process achieves conversion rates in the range of about 98% to 99% of the total triglyceride feed amount. Such process advantages have shown a reduction of monoglyceride content in the biodiesel product stream at percentages of 31.1, 41.8 and 45.9% as compared to a conventional two-stage process. Preferably, an overall monoglyceride reduction in the range of 50% can be achieved. Further, a reduction in diglyceride amount in the biodiesel product stream has been observed at about 44%.

In order to promote a further understanding of the invention, the following examples are provided. These examples are shown by way of illustration and not limitation.

EXAMPLE 1

Two-stage reactor process for transesterification reaction.

Soybean oil as a triglyceride feedstock, methanol and sodium hydroxide catalyst were continuously fed as a reaction mixture into a low-shear reactor to carry out a transesterification reaction. The soybean oil and methanol was reacted in the presence of the sodium hydroxide catalyst to form a first intermediate reacted mixture stream. The ratio of methanol to soybean oil in the reaction mixture was 14.5 by weight. The ratio of the sodium hydroxide catalyst to oil in the reaction mixture was 1.9 by weight. The reaction mixture was heated to a temperature of 60° C. prior to being fed into the low-shear reactor. The low-shear reactor was a tank having a recirculation loop that included a centrifugal pump that was operated at a shear rate of 720 $s^{-1}$.

The residence time of the reaction mixture in the low-shear reactor was 30 minutes. After the reaction mixture was allowed to react for 30 minutes, the first intermediate reacted mixture was passed through decanter to separate glycerol by product formed in the reaction in the low-shear reactor. The remaining portion of the first intermediate reacted mixture having a reduced glycerol content, which contained fatty acid alkyl esters and unreacted triglyceride feedstock, was combined with a fresh, non-recycled alcohol and catalyst to form a second reaction mixture.

The ratio of methanol to soybean oil in the second reaction mixture was 7.4 by weight. The ration of sodium hydroxide catalyst to soybean oil in the second reaction mixture was 0.8 by weight. The second reaction mixture was fed to a second low-shear reactor at a temperature of 60° C. The second low-shear reactor was an identical set up to the first low-shear reactor. The centrifugal pump used in the second low-shear reactor was operated at a shear rate of 680 $s^{-1}$. The residence time of the second reaction mixture in the second low-shear reactor was 30 minutes.

The resulting mixture from the second low-shear reactor was passed through decanter to separate glycerol by product. The resulting reaction product was analyzed for impurity content with the remaining portion being methyl esters. The impurity data is present in Table 1 as weight percent.

TABLE 1

| Monoglycerides | Diglycerides | Triglycerides | Glycerin |
|---|---|---|---|
| 0.57 | 0.15 | 0.10 | 0.19 |

As can be seen from Table 1, the reaction product of the two-stage transesterification reaction process contained about 1 weight percent of impurities. Of the measured impurities, monoglycerides were greater than 0.5 weight percent of the reaction product.

The conversion level of the two-stage transesterification reaction process meets that required by ASTM 6751.

EXAMPLE 2

Three-stage reactor process for transesterification reaction.

Soybean oil as a triglyceride feedstock, methanol and sodium hydroxide catalyst were continuously fed as a reaction mixture into a high-shear reactor to carry out a transesterification reaction. The soybean oil and methanol was reacted in the presence of the sodium hydroxide catalyst to form a first intermediate reacted mixture stream. The ratio of methanol to soybean oil in the reaction mixture was 14.5 by weight. The ratio of the sodium hydroxide catalyst to oil in the reaction mixture was 1.65 by weight. The reaction mixture was heated to a temperature of 60° C. prior to being fed into the high-shear reactor.

The high-shear reactor was a two-stage hydrodynamic cavitation reactor having two cone-shaped baffle bodies positioned in series within a pipe. The total gap between the pipe wall and first cone-shaped baffle body was 0.2 inch. The total gap between the pipe wall and the second cone-shaped baffle body was 0.4 inch. The total pressure drop across the high-shear reactor as the reaction mixture was passed through was about 600 psi. The shear rate produced by the first cone-shaped baffle body was about 12,000 $s^{-1}$. The shear rate produced by the second cone-shaped baffle body was about 8,700 $s^{-1}$. The residence time of the reaction mixture in the high-shear reactor was about 0.0002 seconds.

After the reaction mixture was allowed to react in the high-shear reactor to form a first intermediate reacted mixture, the first intermediate reacted mixture was passed to a low-shear reactor to form a second intermediate reacted mixture. The low-shear reactor was a tank having a recirculation loop that included a centrifugal pump that was operated at a shear rate of 720 $s^{-1}$. The residence time first intermediate reacted mixture in the low-shear reactor was 30 minutes.

The second intermediate reacted mixture was passed through decanter to separate glycerol by product formed in the reaction in the low-shear reactor. The remaining portion of the second intermediate reacted mixture, a purified second intermediate reacted mixture, having a reduced glycerol content, which contained fatty acid alkyl esters and unreacted triglyceride feedstock, was combined with a fresh, non-recycled alcohol and catalyst to form a second reaction mixture.

The ratio of methanol to soybean oil in the second reaction mixture was 7.4 by weight. The ration of sodium hydroxide catalyst to soybean oil in the second reaction mixture was 0.5 by weight. The second reaction mixture was fed to a second low-shear reactor at a temperature of 60° C. The second low-shear reactor was an identical set up to the first low-shear reactor. The centrifugal pump used in the second low-shear reactor was operated at a shear rate of 680 $s^{-1}$. The residence time of the purified second intermediate reacted mixture in the second low-shear reactor was 30 minutes, which thereby formed a crude biodiesel reacted mixture.

The crude biodiesel reacted mixture was passed through decanter to separate it into two phases. The heavy phase, containing glycerol and unreacted methanol, was recycled and mixed in high-shear cavitation reactor with the fresh streams of soybean oil, methanol and sodium hydroxide catalyst. The light phase, a purified biodiesel reacted product containing fatty acid alkyl esters was analyzed for impurity content with the remaining portion being methyl esters. The impurity data is present in Table 2 as weight percent.

TABLE 2

| Monoglycerides | Diglycerides | Triglycerides | Total glycerin |
|---|---|---|---|
| 0.32 | 0.11 | 0.01 | 0.10 |

As can be seen from Table 2, the reaction product of the two-stage transesterification reaction process contained about 0.5 weight percent of impurities. Of the measured impurities, monoglycerides were about 0.3 weight percent of the reaction product, or about 0.2 weight percent less than the two-stage transesterification process of Example 1. The total measured impurities were about 0.5 weight percent less than the total impurities measured for the two-stage transesterification process of Example 1.

The conversion level of the three-stage transesterification reaction process meets that required by ASTM 6751. As compared to the two-stage transesterification process of Example 1, the three-stage transesterification reaction process requires about 20% less catalyst loading to achieve the conversion level required by ASTM 6751. The ratio of triglyceride feedstock to catalyst in the first reaction mixture required to meet the ASTM 6751 standard was about 1.65. The ratio of triglyceride feedstock to catalyst in the second reaction mixture required to meet the ASTM 6751 standard was about 0.5. These ratios represent a reduced catalyst loading that can lead to lower operation costs and a more efficient biodiesel process.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A process for preparing biodiesel comprising:
    (a) reacting a triglyceride feedstock, alcohol and catalyst in a high-shear reactor to form a first intermediate reacted mixture, wherein the high-shear reactor is a cavitation reactor operating at a shear rate of greater than $8{,}000\ s^{-1}$;
    (b) reacting the first intermediate reacted mixture in a low-shear reactor to form a second intermediate reacted mixture;
    (c) removing glycerol and unreacted alcohol from the second intermediate reacted mixture to form a purified second intermediate reacted mixture, the glycerol and unreacted alcohol removed from the second intermediate reacted mixture being recycled back to the high-shear reactor;
    (d) reacting the second intermediate reacted mixture in a second low-shear reactor to form a crude biodiesel reacted mixture, wherein the low-shear and the second low-shear reactor are operating at a shear rate of less than $1{,}000\ s^{-1}$.

2. The process of claim 1, wherein the cavitation reactor is selected from the group consisting of a rotor-rotor and rotor-stator mixer, homogenizer, microfluidizer, hydrodynamic or ultrasonic cavitation device, static mixer, orifice plate, perforated plate, nozzle, venturi eductor or jet mixer.

3. The process according to claim 1, wherein the low-shear reactor and the second low-shear reactor are selected from the group consisting of a batch mixer, agitator, rotor-stator, static mixer or tank equipped with a centrifugal pump recirculation loop.

4. The process of claim 1, further comprising adding additional non-recycled alcohol and additional non-recycled catalyst to the purified second intermediate reacted mixture.

5. The process of claim 4, wherein the ratio of catalyst to triglyceride feedstock being reacted in the second low-shear reactor is from 0.3 to 0.7 by weight.

6. The process of claim 4, wherein the ratio of catalyst to triglyceride feedstock being reacted in the second low-shear reactor is less than 0.8 by weight.

7. The process of claim 4, wherein the alcohol being reacted in the second low-shear reactor is from about 20 to about 80 percent by weight of the additional non-recycled alcohol.

8. The process of claim 4, wherein the catalyst being reacted in the second low-shear reactor is from about 20 to about 100 percent by weight of the additional non-recycled catalyst.

9. The process of claim 8, recycling at least 70 percent of the glycerol and the unreacted alcohol recovered from the crude biodiesel reacted mixture to the high-shear reactor.

10. The process of claim 8, wherein the glycerol is removed from the crude biodiesel reacted mixture by a centrifuge, hydrocyclone or decanter.

11. The process of claim 1, wherein the alcohol being reacted in the high-shear reactor is from about 20 to about 80 percent by weight non-recycled alcohol.

12. The process of claim 1, wherein the catalyst being reacted in the high-shear reactor is from greater than 0 to 80 percent by weight non-recycled catalyst.

13. The process of claim 1, wherein the ratio of catalyst to triglyceride feedstock being reacted in the high-shear reactor is from 1.2 to 1.8 by weight.

14. The process of claim 13, further comprising removing unreacted alcohol, glycerol and fatty acid alkyl esters from the crude biodiesel reacted mixture to form a purified biodiesel product.

15. The process of claim 14, wherein the purified biodiesel product meets the triglyceride feedstock conversion level required by ASTM 6751.

16. A three-stage transesterification reaction for preparing biodiesel comprising:
    (a) reacting a triglyceride feedstock, alcohol and catalyst in a high-shear reactor to form a first intermediate reacted mixture, wherein the high-shear reactor is a cavitation reactor operating at a shear rate of greater than $8{,}000\ s^{-1}$, and wherein the ratio of the catalyst to the triglyceride feedstock is less than 1.9 by weight;
    (b) reacting the first intermediate reacted mixture in a low-shear reactor to form a second intermediate reacted mixture;
    (c) passing the second intermediate reacted mixture through a separation vessel to form a purified second intermediate reacted mixture; removing glycerol and unreacted alcohol from the second intermediate reacted mixture to form a purified second intermediate reacted mixture, the glycerol and unreacted alcohol removed from the second intermediate reacted mixture being recycled back to the high-shear reactor;
    (d) adding additional non-recycled alcohol and additional non-recycled catalyst to the purified second intermediate reacted mixture, wherein the ratio of the total catalyst to the triglyceride feedstock is less than 0.8 by weight;
    (e)) reacting the purified second intermediate reacted mixture in a second low-shear reactor to form a crude biodiesel reacted mixture; wherein the low-shear and the second low-shear reactor are operating at a shear rate of less than $1{,}000\ s^{-1}$,
    (f) passing the crude biodiesel reacted mixture through a separation vessel to form a purified biodiesel product that product meets the triglyceride feedstock conversion level required by ASTM 6751.

* * * * *